(12) United States Patent
Henry

(10) Patent No.: US 6,516,844 B1
(45) Date of Patent: Feb. 11, 2003

(54) SUN PROTECTOR FOR MOTORCYCLES

(76) Inventor: Daniel A. Henry, 2813 N. Richard Dr., LaCrosse, WI (US) 54601

( * ) Notice: Subject to any disclaimer, the term of this patent is extended or adjusted under 35 U.S.C. 154(b) by 0 days.

(21) Appl. No.: 09/934,092

(22) Filed: Aug. 21, 2001

Related U.S. Application Data

(60) Provisional application No. 60/230,830, filed on Sep. 7, 2000.

(51) Int. Cl.$^7$ ................................................ B62J 19/00
(52) U.S. Cl. ...................... 150/167; 150/166; 296/78.1; 296/136
(58) Field of Search ................................. 150/154, 166, 150/167; 296/78.1, 100.11, 100.15; 206/136, 135

(56) References Cited

U.S. PATENT DOCUMENTS

| | | | |
|---|---|---|---|
| 2,455,237 A | * 11/1948 | Davis ...................... 150/154 X |
| 2,718,912 A | * 9/1955 | Zimmerman ................. 150/166 |
| 2,801,667 A | * 8/1957 | Curran ........................ 150/166 |
| 3,537,746 A | 11/1970 | Peters |
| 3,659,872 A | 5/1972 | Warner |
| 3,884,523 A | 5/1975 | Allen |
| 4,171,145 A | 10/1979 | Pearson, Sr. |
| 4,283,084 A | 8/1981 | Gallagher |
| 4,825,889 A | * 5/1989 | Monteith ................. 296/136 X |
| 4,944,340 A | * 7/1990 | Tortorich ..................... 150/167 |
| 5,052,738 A | 10/1991 | Li |
| 5,062,560 A | 11/1991 | Wasden |
| 5,064,239 A | * 11/1991 | Folcik ......................... 296/97.7 |
| 5,188,417 A | * 2/1993 | Curchod ................. 150/166 X |
| 5,290,618 A | * 3/1994 | Olson et al. ............ 150/166 X |
| 5,292,167 A | * 3/1994 | Hellman ................. 150/168 X |
| 5,458,945 A | * 10/1995 | Tall ........................ 150/166 X |
| 5,562,139 A | 10/1996 | Cseri |
| 5,725,933 A | * 3/1998 | Nishiyama ............... 150/167 X |
| 5,795,009 A | 8/1998 | Sack et al. |
| 6,062,601 A | 5/2000 | Willie et al. |
| 6,070,629 A | * 6/2000 | Whiteside .................... 150/166 |

FOREIGN PATENT DOCUMENTS

| | | | |
|---|---|---|---|
| CH | 291977 | * 10/1953 | ................. 150/167 |
| WO | 9215467 | * 9/1992 | ................. 296/136 |

* cited by examiner

*Primary Examiner*—Sue A. Weaver
(74) *Attorney, Agent, or Firm*—Tipton L. Randall

(57) ABSTRACT

The invention is a sunscreen protector for motorcycles that covers the seat and fuel tank area to protect these components from the deteriorating effects of sunlight. The protector shade includes a rectangular sheet of tightly woven nylon/lycra elastomeric material sized to cover only the motorcycle seat and fuel tank. Four elastic strap members and a plurality of hook loop members with attached, coated J-hook members are employed for attachment to selected attachment points on the motorcycle.

14 Claims, 4 Drawing Sheets

SUN PROTECTOR FOR MOTORCYCLES

CROSS-REFERENCE TO RELATED APPLICATIONS, IF ANY

This application claims the benefit under 35 U.S.C. §119(e) of co-pending provisional application Serial No. 60/230,830, filed Sep. 7, 2000. application Serial No. 60/230,830 is hereby incorporated by reference.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates to a sun protector for motorcycles. More particularly, the sun protector covers the seat and fuel tank area of the motorcycle.

2. Background Information

Motorcycle owners often desire to protect their motorcycles from damage that can be caused by exposure to rain and, particularly, to exposure to the sun. Commercially available covers are customarily made of material such as vinyl or canvas which is of essentially non-stretchable character. Such covers are normally relatively large and cumbersome, making them for all practical purposes non-portable for a motorcyclist. Often the covers are contained on a tensioned cylinder within a container which adds bulk and complexity to the cover.

Such covers are usually draped over the cycle and are relatively loose fitting, customarily being secured by ties or the like. In any event, such devices, being loosely fit if it can be considered to be fit at all to the bike, do not afford adequate protection from the elements. This situation is aggravated by virtue of the fact that motorcycles come in various sizes and configurations, and these covers do not.

In addition, motorcycle riders utilizes their motorcycle for many purposes, including pleasure trips, running errands, and riding to and from work. It is therefore desirable that the seat and fuel tank be kept free of dust, dirt, and moisture which may accumulate when the motorcycle is parked, so as not to soil the rider's clothes. In hot climates, the black vinyl material of which motorcycle seats are typically composed may become very hot, causing considerable discomfort to the rider when first mounting the motorcycle, to the point of causing burns in some cases. Such heat further seriously degrades the vinyl material. Many motorcycle riders also take pride in the overall appearance of their motorcycle, especially in the cleanliness and shininess of the fuel tank. The intense sunlight and high temperatures that characterize the motorcycle riding season, rapidly oxidizes the paint or lacquer finish of motorcycle fuel tanks, providing a degraded appearance. Some examples of motorcycle coverings and protectors that have been granted patents include the following:

Peters, in U.S. Pat. No. 3,537,746, describes a folded, thin, flexible protective sheet stored in a housing located at the rear of a motorcycle. The sheet unwinds from the housing and attaches to the handlebars and/or front portion of the frame of the motorcycle with elastic cords or similar devices. The sheet material is described as "nylon" or a similar flexible, waterproof material. A biasing roller spring keeps constant tension on the sheet when in use.

In U.S. Pat. No. 3,659,872, Warner discloses a foldable cover structure that completely covers a motorcycle. The cover has front and rear openings with fasteners and a top opening for the handlebars, with another covering portion that fastens over the top opening.

U.S. Pat. No. 3,884,523 by Allen describes another protective cover for a motorcycle that stores within the seat of the cycle. The cover encloses the entire motorcycle, with no openings, and must be stuffed back into the seat for storage and riding of the motorcycle.

Pearson, Sr., in U.S. Pat. No. 4,171,145, describes a retractable protective covering which may be unrolled from a spring loaded spool mounted in a housing attached to a motorcycle behind the motorcycle seat to cover the seat and the tank of the motorcycle. The covering has a long, rectangular top panel formed of heavy waterproof material, and two long, narrow upper side panels and two long, narrow lower side panels, with an upper and lower side panel on each side of the top panel. A pair of V-shaped bars, fastened to opposite sides of the housing, serve as guides in unfolding the upper and lower panels as the protective cover is extended. The covering is preferably fabricated from a nylon fabric.

In U.S. Pat. No. 4,283,084, Gallagher discloses a protective cover for a motorcycle that is pentagonal in shape. The cover has an elastic curved edge that fits the rear seat portion, a pair of elastic bands for engaging the foot posts, and a set of Velcro strips for joining the cover about the cycle frame between the engine and the front wheel. The cover is described as fabricated from a lightweight, flexible material such as "ripstop" nylon, polyester fabric or other materials which resist the effects of weather.

Li, in U.S. Pat. No. 5,052,738, describes a retractable shading covering constructed of canvas for motorcycles. The covering is stored on a winding reel in a box secured to the rear of the motorcycle. The covering is sufficiently large to accommodate two persons on the cycle, and includes openings for the riders heads, as well as sleeves to allow the driver to steer the cycle with the handlebars from within the covering.

In U.S. Pat. No. 5,062,560, Wasdenshows a flexible protective bicycle cover that fits over the seat, crossbar, handlebars and the front fork of a bicycle. The covering is a contour fitted covering of stretchable material that provides aerodynamic features with little or no protection of the bicycle it is covering.

U.S. Pat. No. 5,562,139 by Cseri discloses a stretchable cover for providing a tight aerodynamic fit on the cycle to protect against the elements while the cycle is at rest or being transported. The cover is stretched over the front structure, the cycle frame and seat, attached to the front structure and seat and secured to the foot pegs to retain the cover on the cycle. Openings are provided in the cover for any side mirrors. The stretchable fabric material can be a nylon spandex fabric, known as Spandura, which is commercially available.

In U.S. Pat. No. 5,795,009, Sack et al. describe a removable sun shade for motorcycles that includes a fabric sheet for extension over the upper part of the motorcycle, forming an air-circulating region between the motorcycle and the sheet. The sheet has a number of attachment members around its edge for securing the sheet to various parts of the motorcycle to hold the sheet in place. A storage pouch is attached to the sheet for reversible attachment to the motorcycle at various locations as most suitable for each model. The material of the fabric sheet is described as "weather resistant with breathability".

Willie et al., in U.S. Pat. No. 6,062,601, describe a protective covering for the fuel tank of a motorcycle. The covering, made up of two portions, straps around the fuel tank with various elastic straps having pairs of Velcro for securing the straps together. The covering protects the fuel tank from puncture by various objects.

Thus, there is an unmet need for a motorcycle protective cover that covers the seat and fuel tank of the cycle, and which can be employed for a large variety of motorcycle designs and sizes. The cover also needs to be easily attached to and detached from the motorcycle and be small enough for convenient storage.

While the invention is amenable to various modifications and alternative forms, specifics thereof have been shown by way of example in the drawings and will be described in detail. It should be understood, however, that the intention is not necessarily to limit the invention to the particular embodiments described. On the contrary, the intention is to cover all modifications, equivalents, and alternatives falling within the spirit and scope of the invention, as defined by the appended claims.

SUMMARY OF THE INVENTION

The invention is a sunscreen protector for motorcycles that covers the seat and fuel tank area to protect these components from the deteriorating effects of sunlight. The protector shade includes a rectangular sheet of tightly woven nylon/lycra elastomeric material sized to cover only the motorcycle seat and fuel tank. The sheet member has a top side and a bottom side with the peripheral edge folded upon the sheet bottom side and stitched thereto with a "zig-zag" stitching that stretches without breaking the stitches, thus forming a finished peripheral edge. The rectangular sheet member has four corners and first and second pairs of parallel edges, with the first edge pair longer than the second edge pair. There are four elastic strap members, each member with first and second ends, with the first end of each strap member secured to the sheet member bottom side at one corner thereof, and the second end of each strap member secured to the sheet member bottom side at a strap member length from the strap member first end along one of the longer parallel sheet edges. The rectangular sheet also includes a plurality of hook loop members secured to the peripheral edge of the sheet member bottom side. Each member of a first pair of hook loop members is fastened to one first parallel sheet edge, a second pair of spaced apart hook loop members is fastened to one second parallel sheet edge, and a third pair of spaced apart hook loop members is fastened to the other second parallel sheet edge. A coated J-hook member is fastened to each hook loop member. Each of the coated, bendable J-hook members is secured at a first end to a hook loop member, with the J-hook member second end adapted for attachment to selected attachment points on the motorcycle.

The sunscreen protector is installed on a motorcycle by slipping two of the elastic strap members over the front signal light fixture and the other two elastic strap members over the rear turn signal light fixtures, with the protector sheet member stretching to cover the seat and fuel tank areas of the motorcycle. Alternatively, one pair of the elastic strap members can be attached to the handle bars or other protruding parts of the motorcycle. The coated J-hooks of the longer parallel sides of the sheet are attached under the seat, and the coated J-hooks of one sheet end are attached to the mirrors or handle bars at the front of the motorcycle, with the coated J-hooks of the opposite end of the sheet attached to the backrest or carrying rack at the rear of the motorcycle.

DESCRIPTION OF THE EMBODIMENTS

Figure 1:
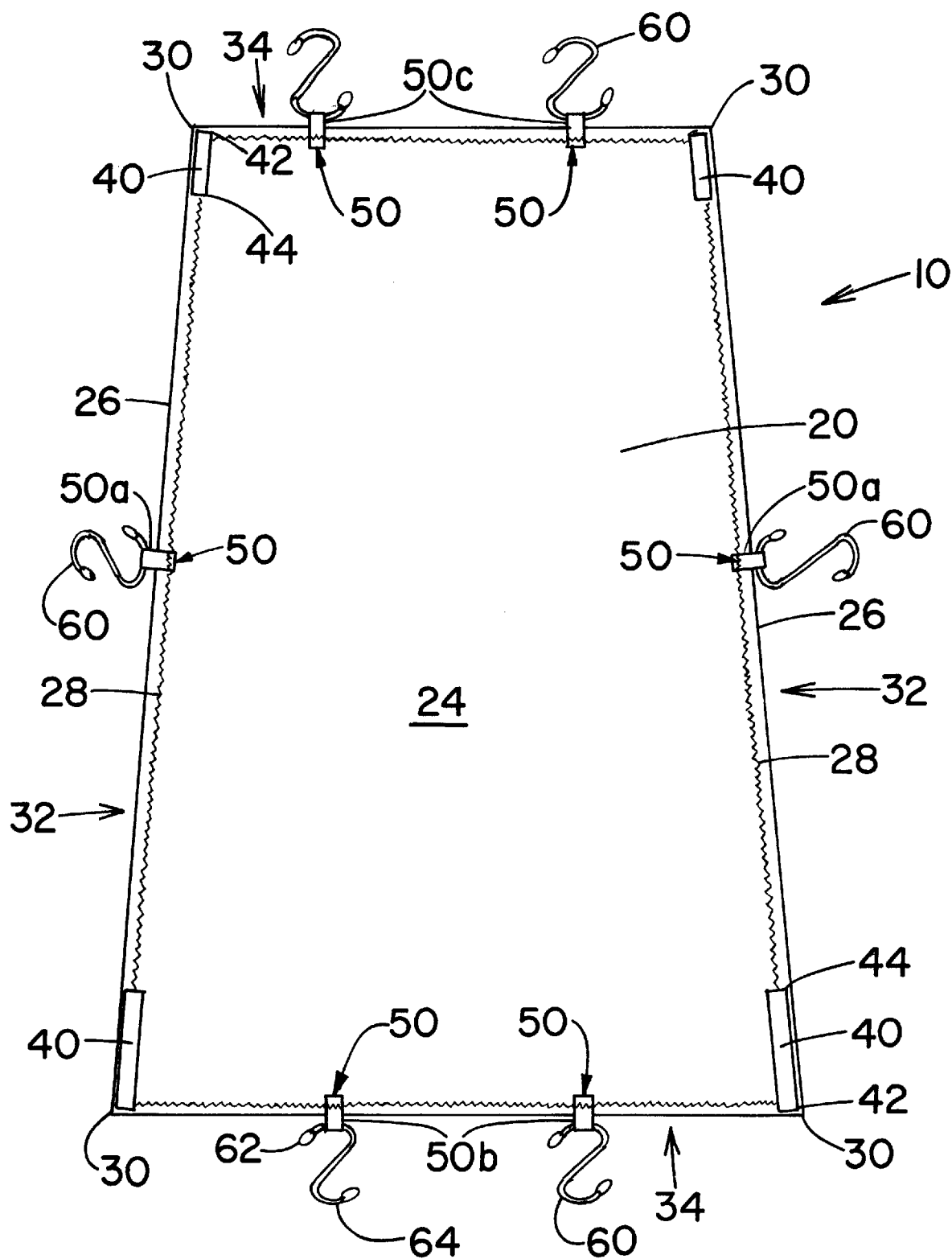
FIG. 1 is a perspective view of the bottom side of the sun protector of the present invention.
Figure 2:
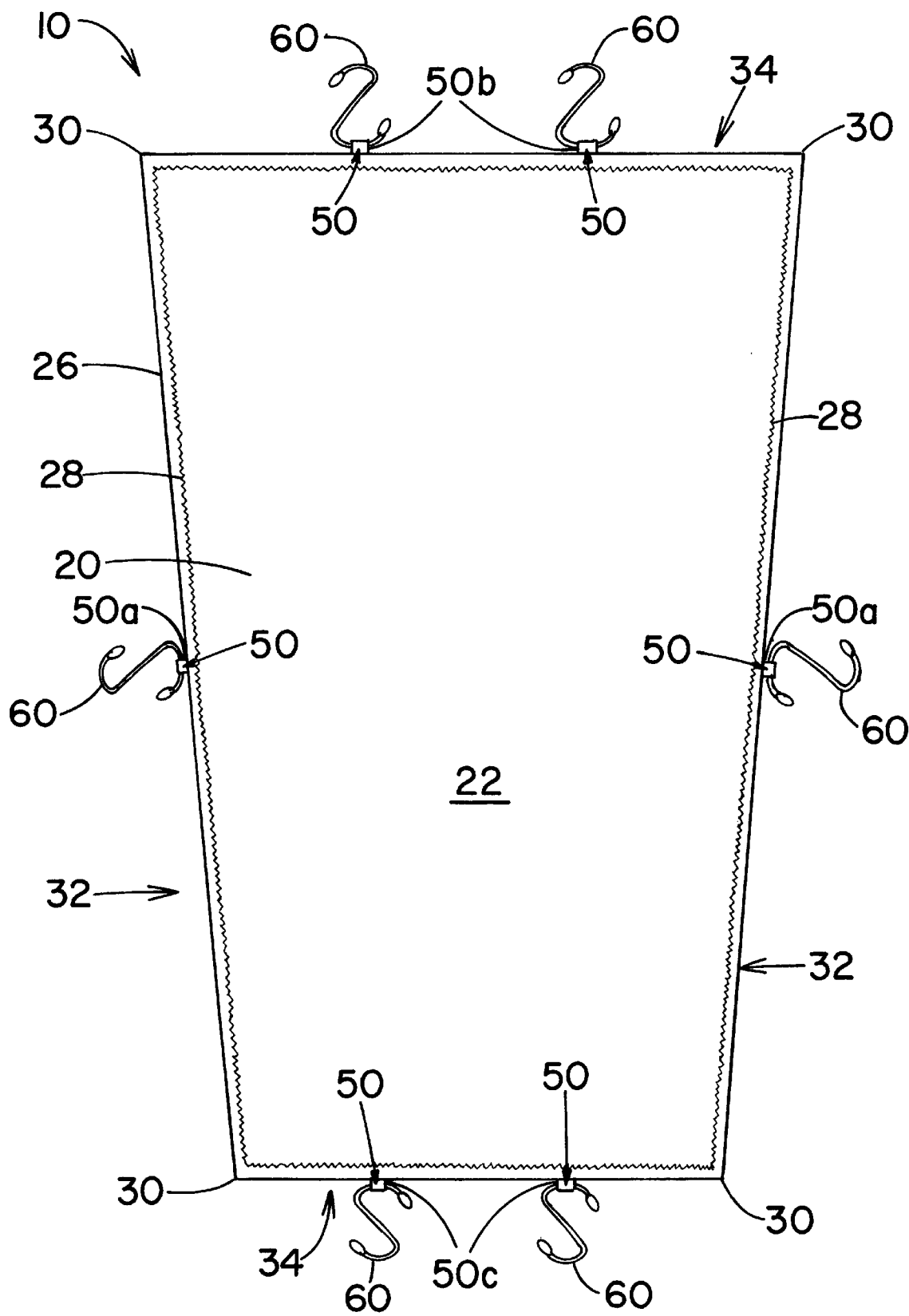
FIG. 2 is a perspective view of the top side of the sun protector of the present invention.

Nomenclature
- 10 Sunscreen Member
- 20 Rectangular Sheet Member
- 22 Top Side of Sheet Member
- 24 Bottom Side of Sheet Member
- 26 Peripheral Edge of Sheet Member
- 28 Zig-Zag Stitching
- 30 Comers of Sheet Member
- 32 First Pair of Edges of Sheet Member
- 34 Second Pair of Edges of Sheet Member
- 40 Strap Members
- 42 First End of Strap Member
- 44 Second End of Strap Member
- 50 Hook Loop Members
- 50a First Pair of Hook Loop Members
- 50b Second Pair of Hook Loop Members
- 50c Third Pair of Hook Loop Members
- 60 Coated J-Hook Members
- 62 First End of J-Hook Member
- 64 Second End of J-Hook Member
- S Seat of Motorcycle
- T Fuel Tank of Motorcycle Construction Referring to FIGS. 1 and 2, a bottom view and a top view respectively of the sunscreen protector 10 of the present invention is shown in a non-functional state. The sunscreen protector 10 is designed to protect key components of a motorcycle during peak hours of exposure to the sun. By covering the seat S and fuel tank T areas, the sunscreen protector 10 prevents deterioration and fading of the covered components. In addition, a motorcycle seat S in direct sunlight can be heated to 130° F. or more, posing discomfort or even injury to a rider mounting the motorcycle. The sunscreen protector 10 shields the seat S from and the sun and reduces the temperature of the seat S for improved rider comfort.

The sunscreen protector 10 is for motorcycles and covers the seat and fuel tank area to protect these components from the deteriorating effects of sunlight. The protector shade 10 includes a rectangular sheet member 20 of tightly woven nylon/lycra elastomeric material sized to cover only the motorcycle seat S and fuel tank T. The nylon/lycra material is preferably 80% nylon and 20% lycra and available from Yasha Fabrics, Inc., Los Angeles, Calif. The sheet member 20 has a top side 22 and a bottom side 24 with peripheral edge 26 folded upon the sheet bottom side 24 and stitched thereto with a "zig-zag" stitching 28 that stretches without breaking the stitches, thus forming a finished peripheral edge 26. The rectangular sheet member 20 has four corners 30 and a first pair of parallel edges 32 and a second pair of parallel edges 34, with the first edge pair 32 longer than the second edge pair 34.

There are four elastic strap members 40, each strap member with a first end 42 and a second end 44. The first end 42 of each strap member 40 is secured to the sheet member bottom side 24 at one corner 30 thereof, and the second end 44 of each strap member 40 is secured to the sheet member bottom side 24 at a strap member length from the strap member first end 42 along one of the longer parallel sheet edges 32, as shown in FIG. 1. The strap member ends 42, 44 are preferably stitched with a zig-zag stitch atop the zig-zag stitching 28 of the peripheral edge 26 for added strength and durability. The elastic strap members 40 and the peripheral edge 26 of elastomeric between the strap member ends 42, 44 thus form expandable openings for use in securing the sunscreen protector 10 to the motorcycle.

The rectangular sheet member 20 also includes a plurality of hook loop members 50 secured to the peripheral edge 26 of the sheet member bottom side 24. The hook loop members 50 are preferably elastic with the loop member 50 preferably stitched with a zig-zag stitch atop the zig-zag stitching 28 of the peripheral edge 26 for added strength and durability. Each member of a first pair of hook loop members 50a is fastened to one first parallel sheet edge 32, preferably with each member 50a at about a midpoint of the sheet edge 32. To each of the hook loop members 50 is secured a coated, bendable J-hook member 60. Each J-hook member 60 is secured at a first end 62 to a hook loop member 50a, with the J-hook member second end 64 adapted for attachment to selected attachment points on the motorcycle, such as beneath the seat S. The bendable J-hook members 60 are preferably fabricated from a mild steel and coated with a polymeric material to protect the motorcycle finish from rust, scratching and wear. The bendable J-hook members 60 are reversibly crimped to a hook loop member 50 using moderate force. For some motorcycles, the four corner strap members 40 plus the first pair of hook loop members 50a, each fastened at a midpoint of the sheet edge 32 with a J-hook member 60 secured to each loop member 50a, are sufficient for securing the sunscreen protector 10 in position.

In a further embodiment of the invention, a second pair of spaced apart hook loop members 50b is fastened to one second parallel sheet edge 34, and a third pair of spaced apart hook loop members 50c is fastened to the other second parallel sheet edge 34, as depicted in FIG. 1. To each of the hook loop members 50b, 50c is secured another coated, bendable J-hook member 60. Each J-hook member 60 is secured at a first end 62 to a hook loop member 50b, 50c, with the J-hook member second end 64 also adapted for attachment to selected attachment points on the motorcycle. The three pairs of hook loop members 50a, 50b, 50c, each with an associated J-hook member 60, plus the four elastic strap members 40, provide increased holding capability for the sunscreen protector 10.

In actual practice, the sunscreen protector 10 is marketed with the four strap members 40 plus the three pairs of hook loop members 50a, 50b 50c. Six coated J-hook members 60 are provided, separated from the loop members 50, so the user can secure a J-hook member 60 only to the hook loop members 50 required to secure the sunscreen protector 10 to a particular motorcycle.

The sunscreen protector 10 is installed on a motorcycle by slipping two of the elastic strap members 40 adjacent one shorter edge 34 over the front signal light fixture and the other two elastic strap members 40 adjacent the other shorter edge 34 over the rear turn signal light fixtures, with the protector sheet member 10 stretching to cover only the seat and fuel tank areas of the motorcycle, and not the motorcycle engine. Alternatively, one pair of the elastic strap members 40 can be attached to the motorcycle handle bars or other protruding parts instead of the front signal light fixture. The coated J-hooks 60 of the hook loop members 50a on the longer parallel sides 32 of the sheet member 20 are attached under the seat, and optionally, the pair of coated J-hooks 60 of the hook loop members 50b of one sheet member parallel edge 34 are attached to the mirrors or handle bars at the front of the motorcycle, with the coated J-hooks 60 of the hook loop members 50c of the opposite sheet member parallel edge 34 attached to the backrest or carrying rack at the rear of the motorcycle.

Figure 3:
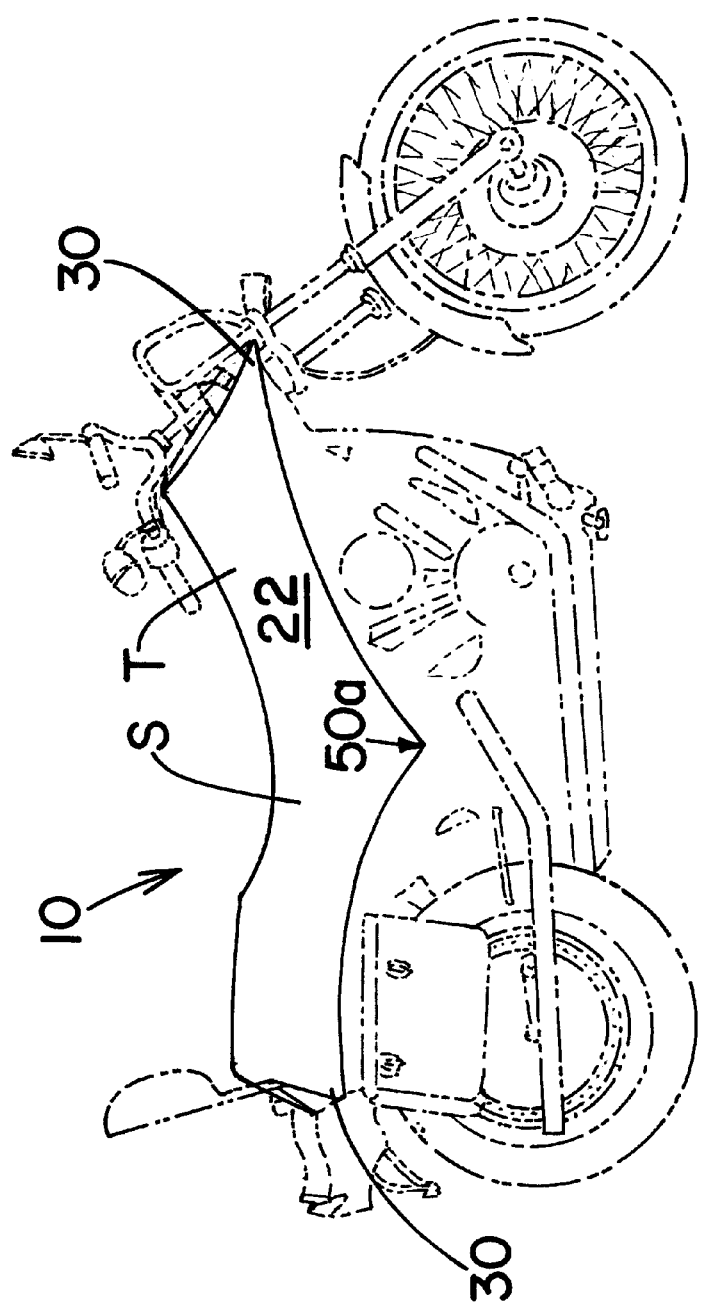
FIG. 3 is a perspective view of the sun protector of present invention attached to a motorcycle.
Figure 4:
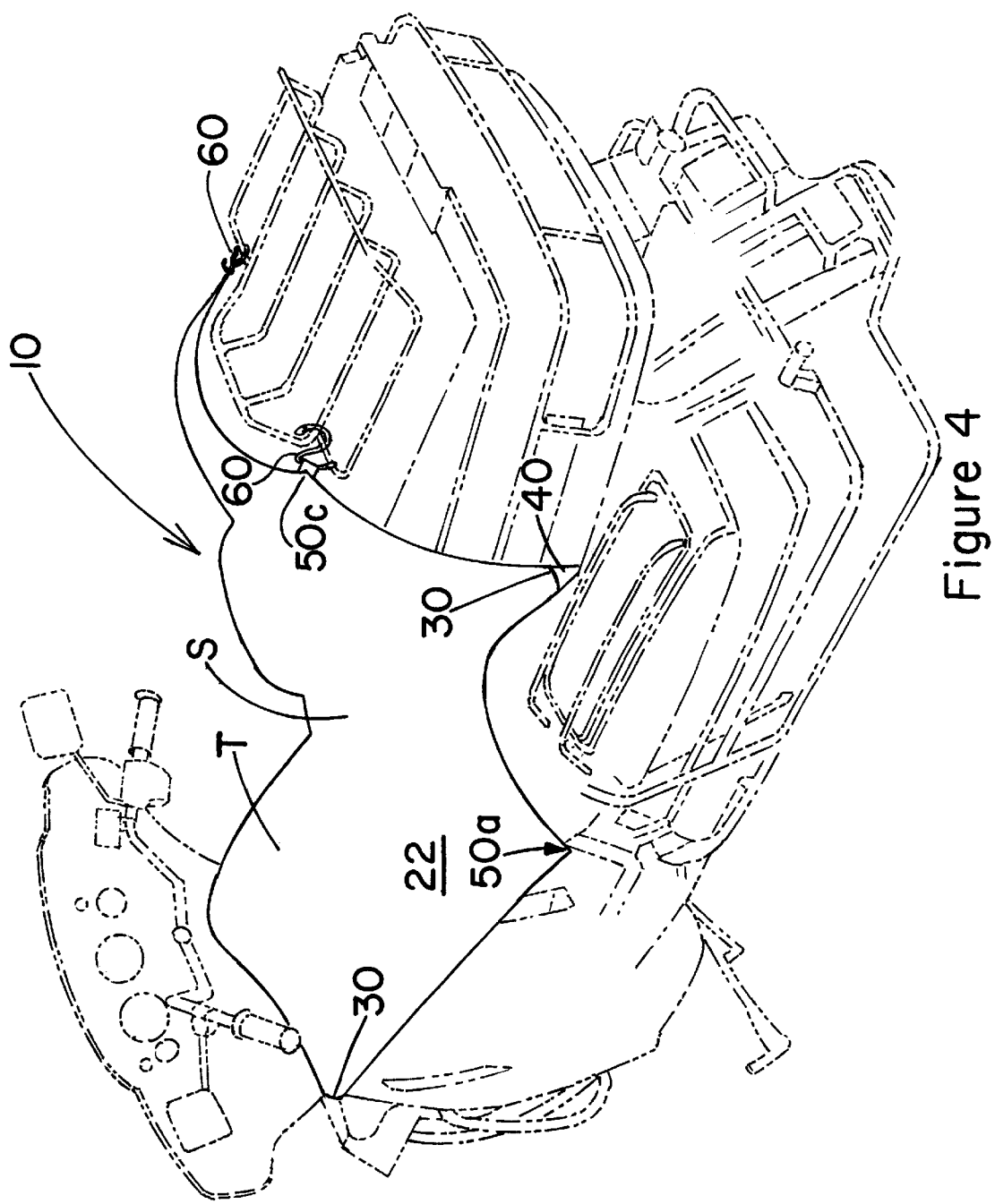
FIG. 4 is a perspective view of the sun protector of present invention attached to a another motorcycle.

The sunscreen protector 10 is shown in the functional state in FIGS. 3 and 4. The elastomeric sheet member 20 stretches to accommodate motorcycles of various sizes and design when covering the seat and fuel tank areas. The hook loop members 50, each with an attached, coated J-hook member 60, serve to further secure the sunscreen protector 10 to the motorcycle in a sleek configuration. Since the sunscreen protector 10 is sized to cover only the seat and fuel tank areas, the motorcycle can be operated with the sunscreen protector 10 in place. The protector 10 does not impede the passage of air around the motorcycle engine for cooling purposes, while the contoured fit of the protector 10 allows a rider to mount the motorcycle with the protector 10 in place, if desired. The protector 10 is easily and quickly installed or removed from a motorcycle using the straps 40 and coated J-hook members 60 as attachment means. The protector 10 readily folds up to a small size for easy storage and transport. It is important to appreciate that the protector 10 is not permanently attached to the motorcycle and, that the protector 10 can be entirely removed and carried away from the motorcycle itself.

While the invention has been particularly shown and described with reference to preferred embodiments thereof, it will be understood by those skilled in the art that various changes in form and details may be made therein without departing from the spirit and scope of the invention.

I claim:

1. A sunscreen for a motorcycle having a seat and a fuel tank comprising:
    (a) a rectangular sheet member of elastomeric material sized to cover only the motorcycle seat and fuel tank, the sheet member having a top side and a bottom side with peripheral edge there around, the rectangular sheet member having four corners and first and second pairs of parallel edges, with the first edge pair longer than the second edge pair;
    (b) four elastic strap members, each strap member with first and second ends, the first end of each strap member secured to the sheet member bottom side at one corner thereof, and the second end of each strap member secured to the sheet member bottom side at a strap member length from the strap member first end along one of the longer parallel sheet edges, thereby forming a corner attachment thereon;
    (c) a plurality of loop members secured to the peripheral edge of the sheet member; and
    (d) a like plurality of bendable J-hook members, each J-hook member secured at a first end to a loop member, with the J-hook member second end adapted for attachment to selected attachment points on the motorcycle.

2. The sunscreen for a motorcycle according to claim 1 wherein, the rectangular sheet member of elastomeric material is composed of 80% nylon and 20% lycra.

3. The sunscreen for a motorcycle according to claim 1 wherein, the peripheral edge is folded upon the sheet bottom side and stitched thereto, forming a finished peripheral edge.

4. The sunscreen for a motorcycle according to claim 3 wherein, the peripheral edge is stitched to the sheet bottom side with zig-zag stitching.

5. The sunscreen for a motorcycle according to claim 1 wherein, the plurality of loop members includes a first pair of loop members, each member fastened to one first parallel sheet edge at a midpoint thereof.

6. The sunscreen for a motorcycle according to claim 1 wherein, the plurality of loop members includes a second pair of spaced apart loop members fastened to one second parallel sheet edge, and a third pair of spaced apart loop members fastened to the other second parallel sheet edge.

7. The sunscreen for a motorcycle according to claim 1 wherein, the four strap members and plurality of loop members are secured to the bottom side of the sheet member.

8. The sunscreen for a motorcycle according to claim 1 wherein, the J-hook members are coated with a polymeric material to prevent marring of the finish of the motorcycle.

9. A sunscreen for a motorcycle having a seat and a fuel tank comprising:

(a) a rectangular sheet member of elastomeric material sized to cover only the motorcycle seat and fuel tank, the sheet member having a top side and a bottom side with peripheral edge there around, the peripheral edge folded upon the sheet bottom side and stitched thereto, forming a finished peripheral edge, the rectangular sheet member having four corners and first and second pairs of parallel edges, with the first edge pair longer than the second edge pair;

(b) four elastic strap members, each member with first and second ends, the first end of each strap member secured to the sheet member bottom side at one corner thereof, and the second end of each strap member to the sheet member bottom side at a strap member length from the strap member first end along one of the longer parallel sheet edges;

(c) a plurality of hook loop members secured to the peripheral edge of the sheet member bottom side, including a first pair of hook loop members, each member fastened to one first parallel sheet edge, a second pair of spaced apart hook loop member fastened to one second parallel sheet edge, and a third pair of spaced apart hook loop members fastened to the other second parallel sheet edge; and (d) a like plurality of coated, bendable J-hook members, each J-hook member secured at a first end to a hook loop member, with the J-hook member second end adapted for attachment to selected attachment points on the motorcycle.

10. The sunscreen for a motorcycle according to claim 9 wherein, the rectangular sheet member of elastomeric material is composed of 80% nylon and 20% lycra.

11. The sunscreen for a motorcycle according to claim 9 wherein, the peripheral edge is stitched to the sheet bottom side with zig-zag stitching.

12. The sunscreen for a motorcycle according to claim 9 wherein, the J-hook members are coated with a polymeric material to prevent marring of the finish of the motorcycle.

13. A sunscreen for a motorcycle having a seat and a fuel tank comprising:

(a) a rectangular sheet member of elastomeric material composed of 80% nylon and 20% lycra, the sheet member sized to cover only the motorcycle seat and fuel tank, the sheet member having a top side and a bottom side with peripheral edge there around, the peripheral edge folded upon the sheet bottom side and stitched thereto with zig-zag stitching, thereby forming a finished peripheral edge, the rectangular sheet member having four corners and first and second pairs of parallel edges, with the first edge pair longer than the second edge pair;

(b) four elastic strap members, each member with first and second ends, the first end of each strap member secured to the sheet member bottom side at one corner thereof, and the second end of each strap member secured to the sheet member bottom side at a strap member length from the strap member first end along one of the longer parallel sheet edges;

(c) a plurality of loop members secured to the peripheral edge of the sheet member bottom side, including a first pair of loop members, each member fastened to one first parallel sheet edge, a second pair of spaced apart loop members fastened to one second parallel sheet edge, and a third pair of spaced apart loop members fastened to the other second parallel sheet edge; and (d) a like plurality of coated, bendable J-hook members, each J-hook member secured at a first end to a loop member, with the J-hook member second end adapted for attachment to selected attachment points on the motorcycle.

14. The sunscreen for a motorcycle according to claim 13 wherein, the J-hook members are coated with a polymeric material to prevent marring of the finish of the motorcycle.

* * * * *